United States Patent
Chen et al.

(10) Patent No.: US 7,643,220 B2
(45) Date of Patent: Jan. 5, 2010

(54) ZOOM LENS

(75) Inventors: Jung-Yao Chen, Hsinchu (TW);
Yu-Hung Chou, Hsinchu (TW);
Chien-Hsiung Tseng, Hsinchu (TW);
Kuo-Chuan Wang, Hsinchu (TW);
Fu-Ming Chuang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 27 days.

(21) Appl. No.: 12/044,580

(22) Filed: Mar. 7, 2008

(65) Prior Publication Data

US 2009/0015936 A1     Jan. 15, 2009

(30) Foreign Application Priority Data

Jul. 13, 2007    (TW) .............................. 96125629 A

(51) Int. Cl.
*G02B 15/14* (2006.01)
(52) U.S. Cl. ........................................ 359/680; 359/691
(58) Field of Classification Search ................. 359/691, 359/680–682, 683, 684–685
See application file for complete search history.

(56) References Cited

U.S. PATENT DOCUMENTS

| | | | |
|---|---|---|---|
| 4,770,509 A | 9/1988 | Hayashi et al. ............. 359/682 |
| 5,076,677 A * | 12/1991 | Sato ............................ 359/680 |
| 5,175,649 A | 12/1992 | Uzawa | |
| 5,329,402 A * | 7/1994 | Sato ............................ 359/691 |
| 5,541,772 A | 7/1996 | Lin | |
| 5,546,232 A | 8/1996 | Hirakawa | |
| 5,552,937 A | 9/1996 | Ono et al. ................... 359/691 |
| 6,809,882 B2 | 10/2004 | Takatsuki | |
| 6,839,183 B2 | 1/2005 | Ohashi ........................ 359/689 |
| 6,917,477 B2 | 7/2005 | Takatsuki ................... 359/691 |
| 6,989,941 B2 | 1/2006 | Tomioka ..................... 359/680 |
| 7,050,240 B2 | 5/2006 | Tomioka | |
| 7,061,687 B2 | 6/2006 | Adachi | |
| 7,075,729 B2 | 7/2006 | Wang ......................... 359/681 |
| 7,075,733 B2 | 7/2006 | Itoh | |

\* cited by examiner

*Primary Examiner*—Mohammed Hasan
(74) *Attorney, Agent, or Firm*—J.C. Patents

(57) ABSTRACT

A zoom lens including a first lens group with a negative refractive power and a second lens group with a positive refractive power is provided. The first lens group includes a first lens, a second lens, and a third lens arranged from an object side to an image side in sequence. The refractive powers of the first, second, and third lenses are negative, negative, and positive sequentially. The second lens group includes a fourth lens, a fifth lens, a sixth lens, and a seventh lens arranged from the object side to the image side in sequence. The refractive powers of the fourth, fifth, sixth, and seventh lenses are positive, positive, negative, and positive sequentially. The first lens group and the second lens group are capable of moving between the object side and the image side.

14 Claims, 17 Drawing Sheets

Wide-end

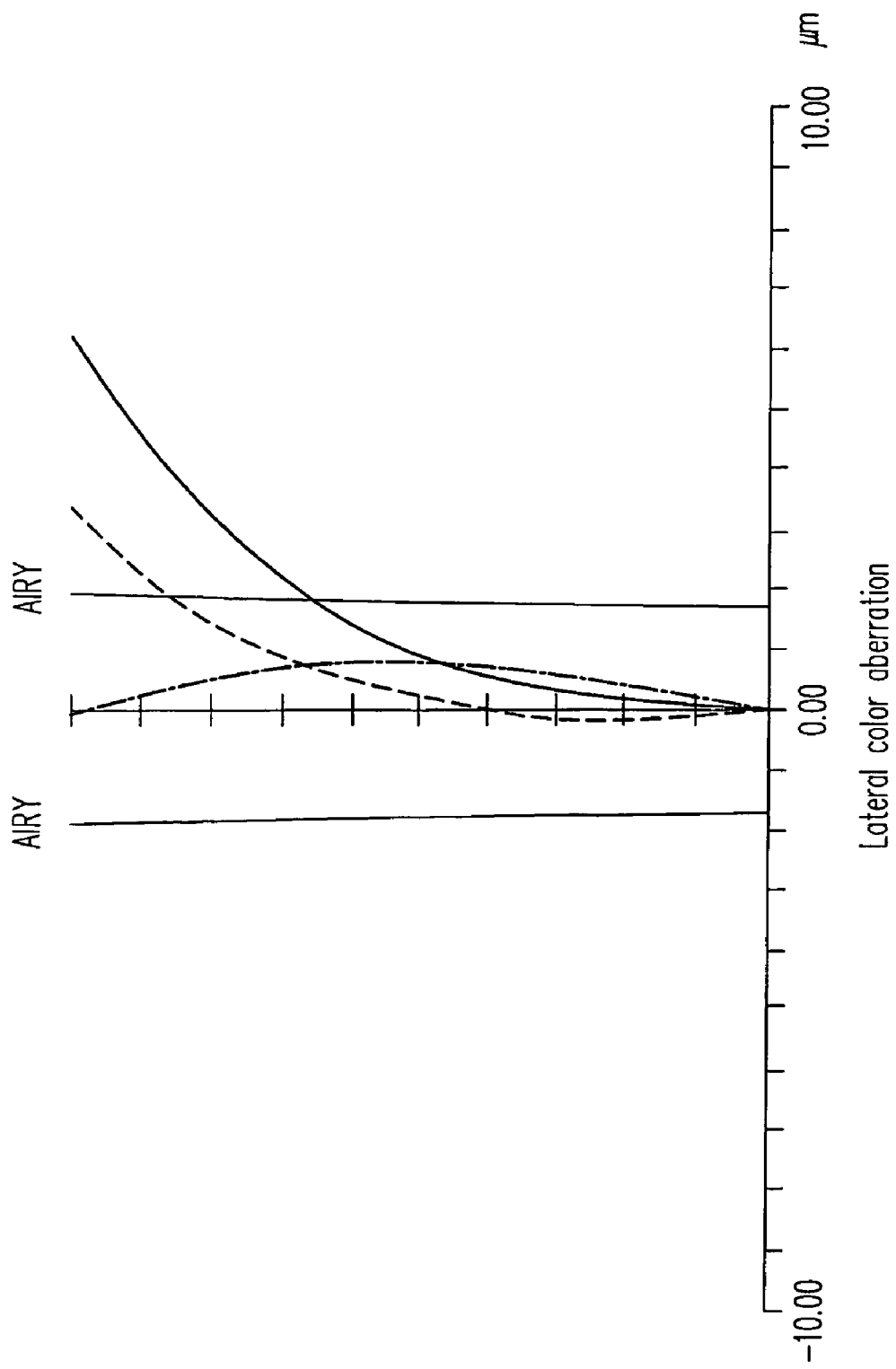

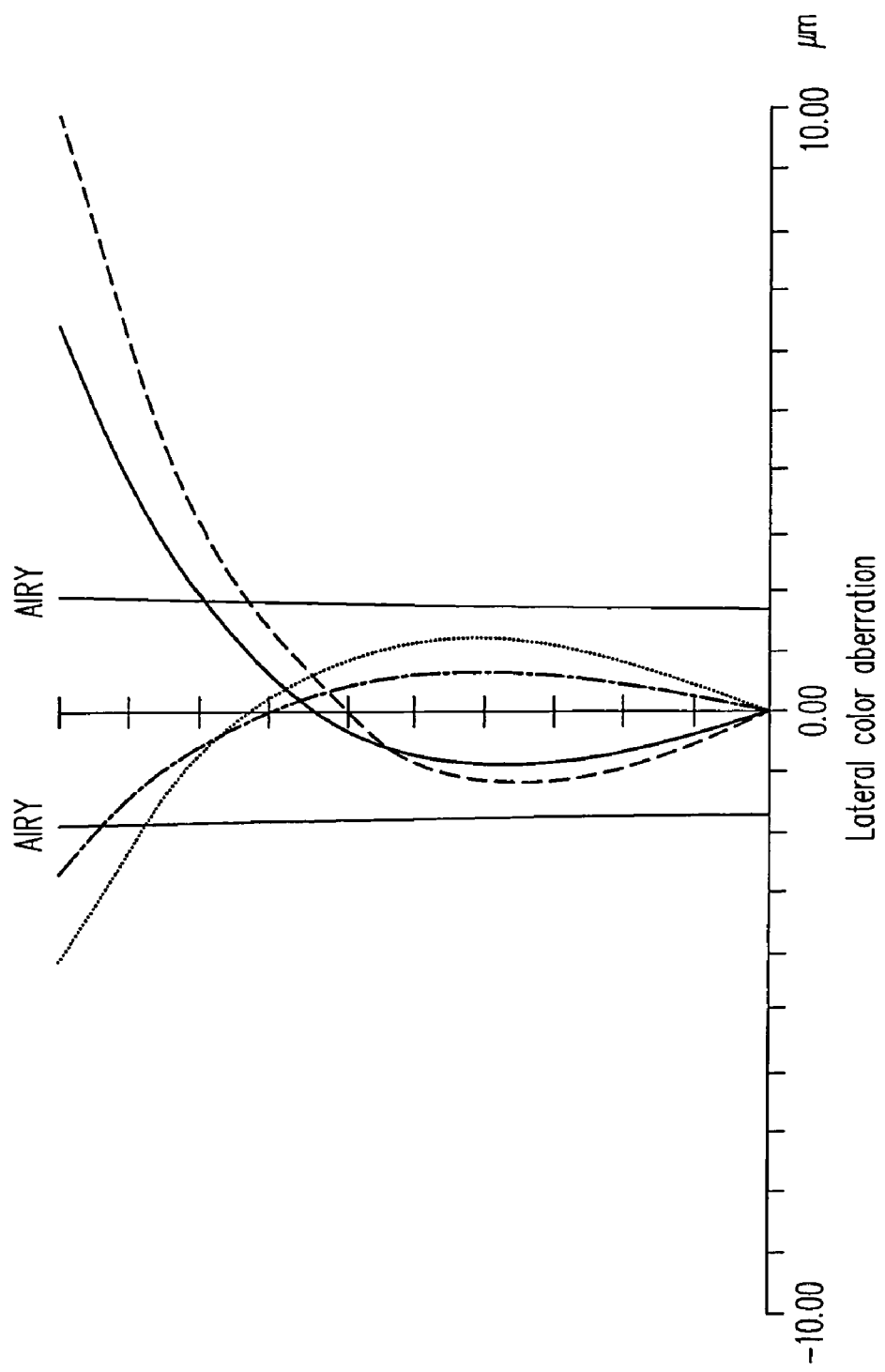

ZOOM LENS

CROSS-REFERENCE TO RELATED APPLICATION

This application claims the priority benefit of Taiwan application serial no. 96125629, filed on Jul. 13, 2007. The entirety of the above-mentioned patent application is hereby incorporated by reference herein and made a part of this specification.

BACKGROUND OF THE INVENTION

1. Field of the Invention

The present invention relates to a lens, and more particularly to a zoom lens.

2. Description of Related Art

Referring to FIG. 1, a zoom lens 100 disclosed in U.S. Pat. No. 5,329,402 includes a first lens group 110 and a second lens group 120. The first lens group 110 is composed of three lenses 112, 114, and 116, and the second lens group 120 is composed of five lenses 122, 124, 126, 128, and 129. Since an f-number of the zoom lens 100 is between 3.6 and 4.6, an aperture of the zoom lens 100 is small, and it is difficult to achieve a larger relative aperture.

Based on the above, in the conventional art, in order to achieve a small f-number of the zoom lens and to keep a good imaging quality, an aspheric lens is usually used for eliminating image aberration. The zoom lens 200 in FIG. 2 disclosed in the U.S. Pat. No. 5,541,772 includes a first lens group 210 and a second lens group 220. The first lens group 210 is composed of three lenses 212, 214, and 216, and the second lens group 120 is composed of two lenses 222 and 224. In order to achieve the smaller f-number of the zoom lens 200 while keeping a good imaging quality, the lenses 214 and 216 in the first lens group 210 and the lens 222 in the second lens group 220 are all aspheric lenses. However, the aspheric lenses are expensive, so the manufacturing cost of the zoom lens 200 is very high.

SUMMARY OF THE INVENTION

The present invention is directed to a zoom lens having a low manufacturing cost.

A zoom lens provided in an embodiment of the present invention includes a first lens group and a second lens group. The first lens group has a negative refractive power, and the first lens group includes a first lens, a second lens, and a third lens arranged from an object side to an image side in sequence. The first lens is a convex-concave lens having a convex surface facing the object side, the second lens is a concave lens, and the third lens is a convex lens. The second lens group has a positive refractive power and is disposed between the first lens group and the image side. The second lens group includes a fourth lens, a fifth lens, a sixth lens, and a seventh lens arranged from the object side to the image side in sequence. Refractive powers of the fourth lens, fifth lens, sixth lens, and seventh lens are positive, positive, negative, and positive, sequentially. The first lens group and the second lens group are capable of moving between the object side and the image side.

Because the zoom lens is able to eliminate distortion, image aberration, and color aberration effectively without aspheric lenses, a good imaging quality is obtained by using the zoom lens.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6A to 6C are diagrams showing optical simulation data of imaging of the zoom lens in FIG. 5B.

FIGS. 10A to 10C are diagrams showing optical simulation data of imaging of the zoom lens in FIG. 9B.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
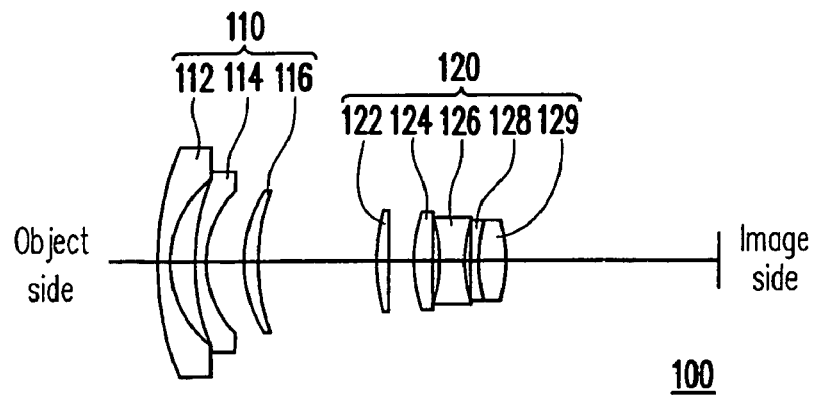
FIG. 1 is a schematic view of a conventional zoom lens.
Figure 2:
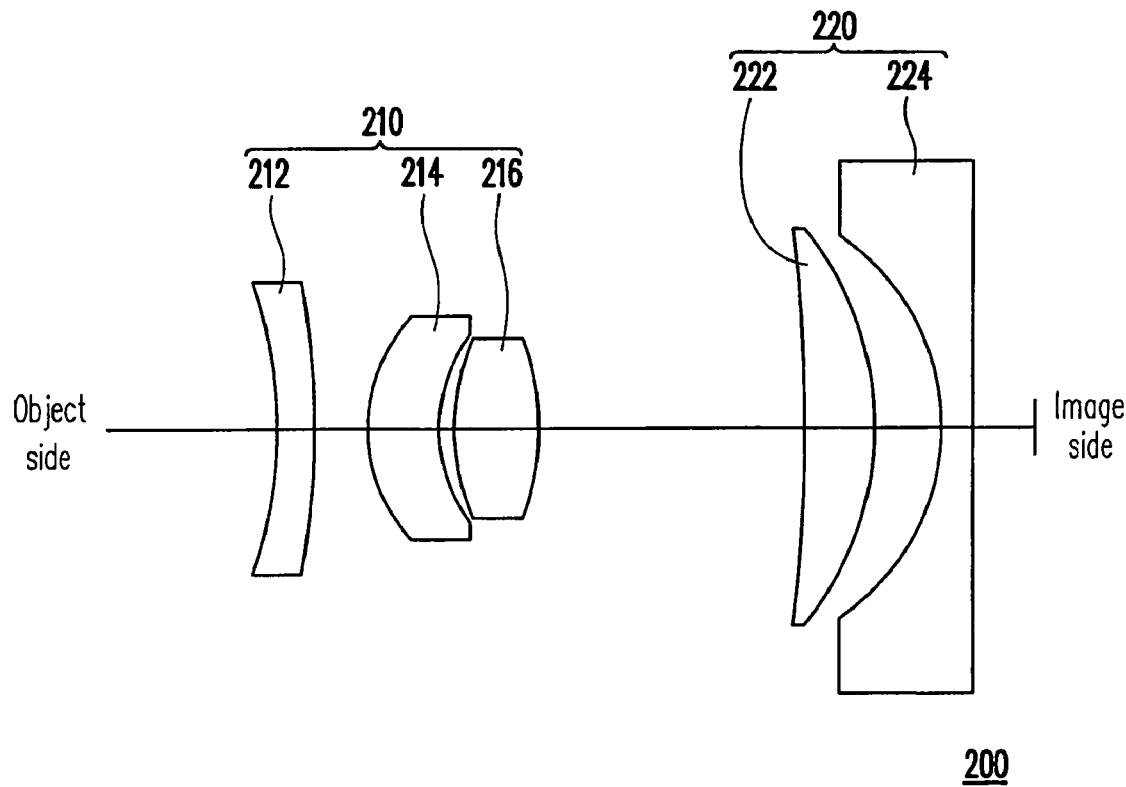
FIG. 2 is a schematic view of another conventional zoom lens.
Figure 3A:
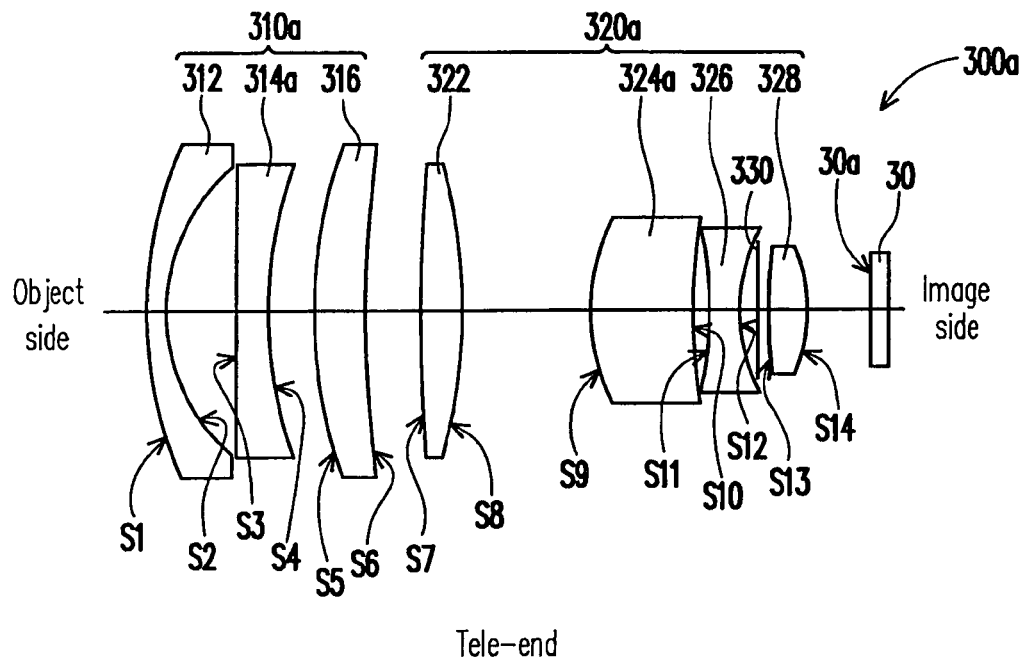
FIGS. 3A to 3B are schematic views of a zoom lens at a tele-end and a wide-end respectively according to a first embodiment of the present invention.
Figure 3B:
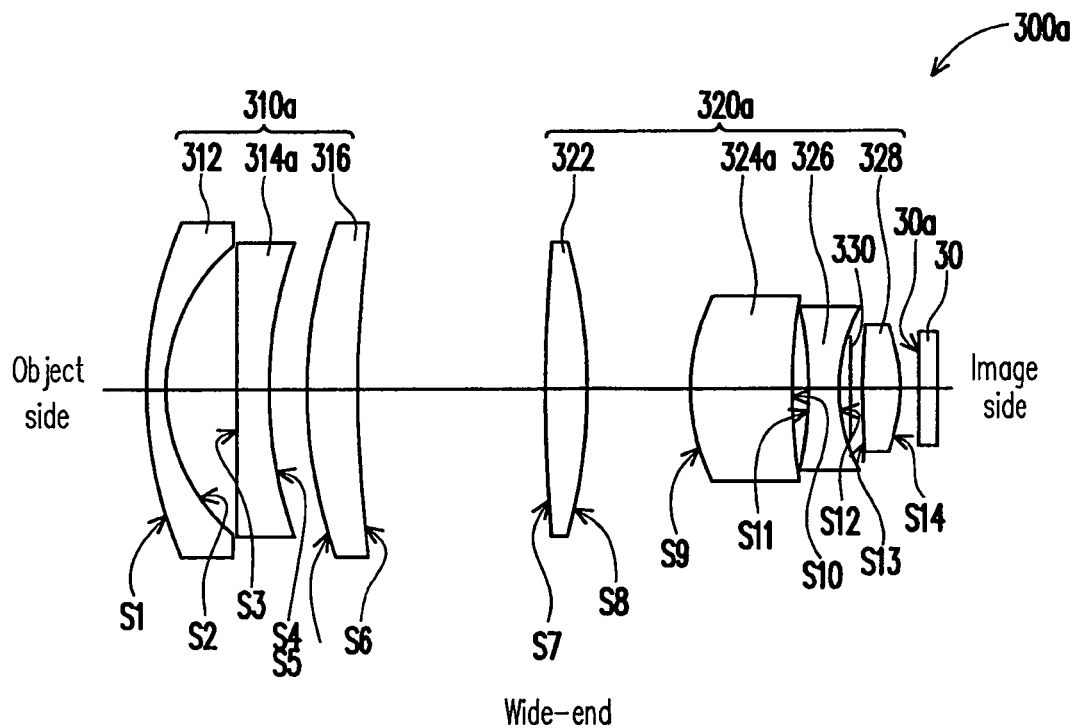

FIGS. 3A to 3B are schematic views of a zoom lens at a tele-end and a wide-end respectively according to a first embodiment of the present invention. Referring to FIGS. 3A and 3B, the zoom lens 300a may be used as a lens of a projector, a camera, a video camera, or a monitor. The zoom lens 300a is disposed between an object side and an image side. Generally speaking, an image processing unit 30 having an active surface 30a is disposed at the image side. The image processing unit 30 may be a photosensitive device or a light valve. The photosensitive device is, for example, a charge coupled device (CCD) or a Complementary Metal_Oxide_Semiconductor image sensing device (CMOS image sensing device), and the light valve may be a digital micromirror device (DMD) or a liquid crystal on silicon panel (LCOS panel). For example, if the zoom lens 300a is applied in a camera, a video camera, or a monitor, and the image processing unit 30 is the photosensitive device, if the zoom lens 300a is applied in a projector, the image processing unit 30 is the light valve The zoom lens 300a includes a first lens group 310a and a second lens group 320a arranged from the object side to the image side in sequence. The first lens group 310a has a negative refractive power, and the second lens group 320a has a positive refractive power. The first lens 310a group includes a first lens 312, a second lens 314a, and a third lens 316 arranged from the object side to the image side in sequence. The first lens 312 is a convex-concave lens having a convex surface facing the object side. The second lens 314a is a plano-concave lens having a planar surface facing the object side, and the third lens 316 is a concave-convex lens. Therefore, the first lens 312 and the second lens 314a both have a negative refractive power, and the third lens 316 has a positive refractive power. Moreover, the second lens group 320a is disposed between the first lens group 310a and the image side, and for example, the second lens group 320a is composed of a fourth lens 322, a fifth lens 324a, a sixth lens 326, and a seventh lens 328 arranged from the object side to the image side in sequence. Refractive powers of the fourth lens 322, fifth lens 324a, sixth lens 326, and seventh lens 328 are positive, positive, negative, and positive sequentially. In this embodiment, the fourth lens 322 and the seventh lens 328 are, for example, both biconvex lenses. The fifth lens 324a is, for example, a concave-convex lens having a convex surface facing the object side, and the sixth lens 326 is, for example, a biconcave lens. Moreover, in this embodiment, the first lens 312, the second lens 314a, the third lens 316, the fourth lens 322, the fifth lens 324a, the sixth lens 326, and the seventh lens 328 are all spherical lenses.

The first lens group 310a and the second lens group 320a may move between the object side and the image side to adjust an effective focal length (EFL) of the zoom lens 300a. In detail, when the EFL of the zoom lens 300a is adjusted from the wide-end to the tele-end, the first lens group 310a and the second lens group 320a are moving to approach each other. When the EFL of the zoom lens 300a is adjusted from the tele-end to the wide-end, the first lens group 310a and the second lens group 320a are moving away from each other.

In order to reduce a total length of the zoom lens 300a, it is limited that Et×fw/ft<6.5, where ft is the EFL of the zoom lens 300a at the tele-end, Et is a distance between the third lens 316 and the fourth lens 322 when the zoom lens 300a is at the tele-end, and fw is the EFL of the zoom lens 300a at the wide-end. In order to prevent a connecting mechanism of the zoom lens 300a from interference, it is limited that Et×fw/ft>3.

Based on the above, the zoom lens 300a further includes an aperture stop 330 disposed between the sixth lens 326 and the seventh lens 328. In detail, the aperture stop 330 may be disposed on a surface S12 of the sixth lens 326, a surface S13 of the seventh lens 328, or between the surface S12 and the surface S13 without contacting the sixth lens 326 or the seventh lens 328. Moreover, the aperture stop 330 moves along with the second lens group 320a.

In this embodiment, in order to reduce spherical aberration and astigmatism, it is limited that N6>1.65, where N6 is a refractive index of the sixth lens 326. Moreover, in order to reduce the material cost of the sixth lens 326, it is limited that N6<1.85. In order to avoid color aberration, it is limited that V6<40, where V6 is an Abbe number of the sixth lens 326.

In this embodiment, the first lens group 310a may be used as a compensation group for eliminating spherical aberration and distortion. In the second lens group 320a, the fourth lens 322, the fifth lens 324a, and the seventh lens 328 may be made of a crown glass with a low dispersion coefficient (between 35 and 75), and the sixth lens 326 may be made of a flint glass with a high dispersion coefficient (between 20 and 50). The zoom lens 300a of this embodiment can eliminate longitudinal color aberration and lateral color aberration effectively. Moreover, since the aspheric lenses are not used in this embodiment, the manufacturing cost of the zoom lens 300a is reduced.

An embodiment of the zoom lens 300a is illustrated hereinafter. It should be noted that the data listed in Tables 1 and Tables 2 are not intended to limit the present invention, and people skilled in the art can make some appropriate alternations on the parameters or settings with reference to the disclosure of the present invention without departing from the scope of the present invention.

TABLE 1

| Surface | Curvature (1/mm) | Pitch (mm) | Refractive Index | Abbe Number | Remarks |
|---|---|---|---|---|---|
| S1 | 0.0201 | 8.3696 | 1.743 | 51.2 | The First Lens |
| S2 | 0.0450 | 5.6517 | | | |
| S3 | 0 | 2.0887 | 1.638 | 60.2 | The Second Lens |
| S4 | 0.0262 | 11.3924 | | | |
| S5 | 0.0202 | 5.9819 | 1.846 | 24.0 | The Third Lens |
| S6 | 0.0103 | Variable Pitch (d1) | | | |
| S7 | 0.0096 | 3.4027 | 1.678 | 59.5 | The Fourth Lens |
| S8 | −0.0217 | 3.6228 | | | |
| S9 | 0.0605 | 5.0035 | 1.678 | 55.1 | The Fifth Lens |
| S10 | 0.0052 | 0.6659 | | | |
| S11 | −0.0184 | 7.2783 | 1.785 | 25.6 | The Sixth Lens |
| S12 | 0.0671 | 1.8054 | | | |
| S13 | 0.0087 | 4.8935 | 1.744 | 46.9 | The Seventh Lens |
| S14 | −0.0479 | Variable Pitch (d2) | | | |

In Table 1, the pitch refers to a straight distance on a main axis between two neighboring surfaces. For example, the pitch of the surface S1 refers to a straight distance on a main axis between the surface S1 and the surface S2. The corresponding thickness, refractive index, and Abbe number of each lens in the Remarks column refers to the numeral values of the pitch, refractive index, and the Abbe number in the same row. Moreover, in Table 1, the surfaces S1 and S2 are two surfaces of the first lens 312. The surfaces S3 and S4 are two surfaces of the second lens 314a. The surfaces S5 and S6 are two surfaces of the third lens 316. The surfaces S7 and S8 are two surfaces of the fourth lens 322. The surfaces S9 and S10 are two surfaces of the fifth lens 324a. The surfaces S11 and S12 are two surfaces of the sixth lens 326. The surfaces S13 and S14 are two surfaces of the seventh lens 328. Since the first lens group 310a may move relative to the second lens group 320a, the distance between the first lens group 310a and the second lens group 320a is the variable pitch d1. A distance between the surface S14 and the image processing unit 30 is the variable pitch d2.

The curvature, pitch, and other values of each surface are given in Table 1 for reference, and will not be repeated herein.

TABLE 2

|  |  | Wide-end | Tele-end |
|---|---|---|---|
| Effective Focal Length (EFL) |  | 19.86 | 23.82 |
| f-number |  | 2.55 | 2.78 |
| Variable Pitch (mm) | d1 | 16.898 | 6.475 |
|  | d2 | 21.505 | 23.949 |

Some important parameters of a focal length of the zoom lens 300a at the wide-end and the tele-end listed in Table 2 include EFL, variable pitches d1 and d2, and f-numbers.

Figure 4A:
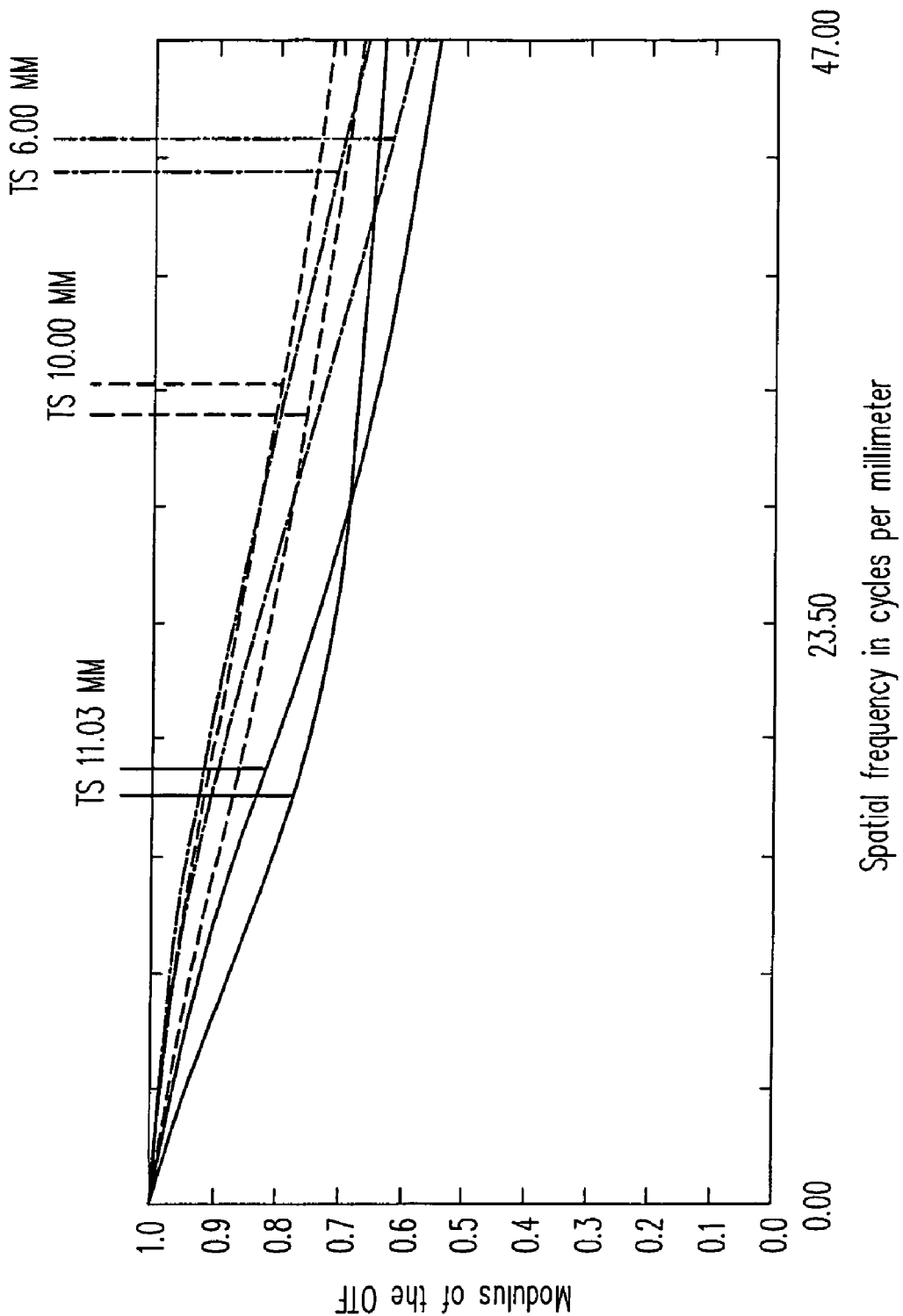
FIGS. 4A to 4C are diagrams showing optical simulation data of imaging of the zoom lens in FIG. 3B.
Figure 4B:
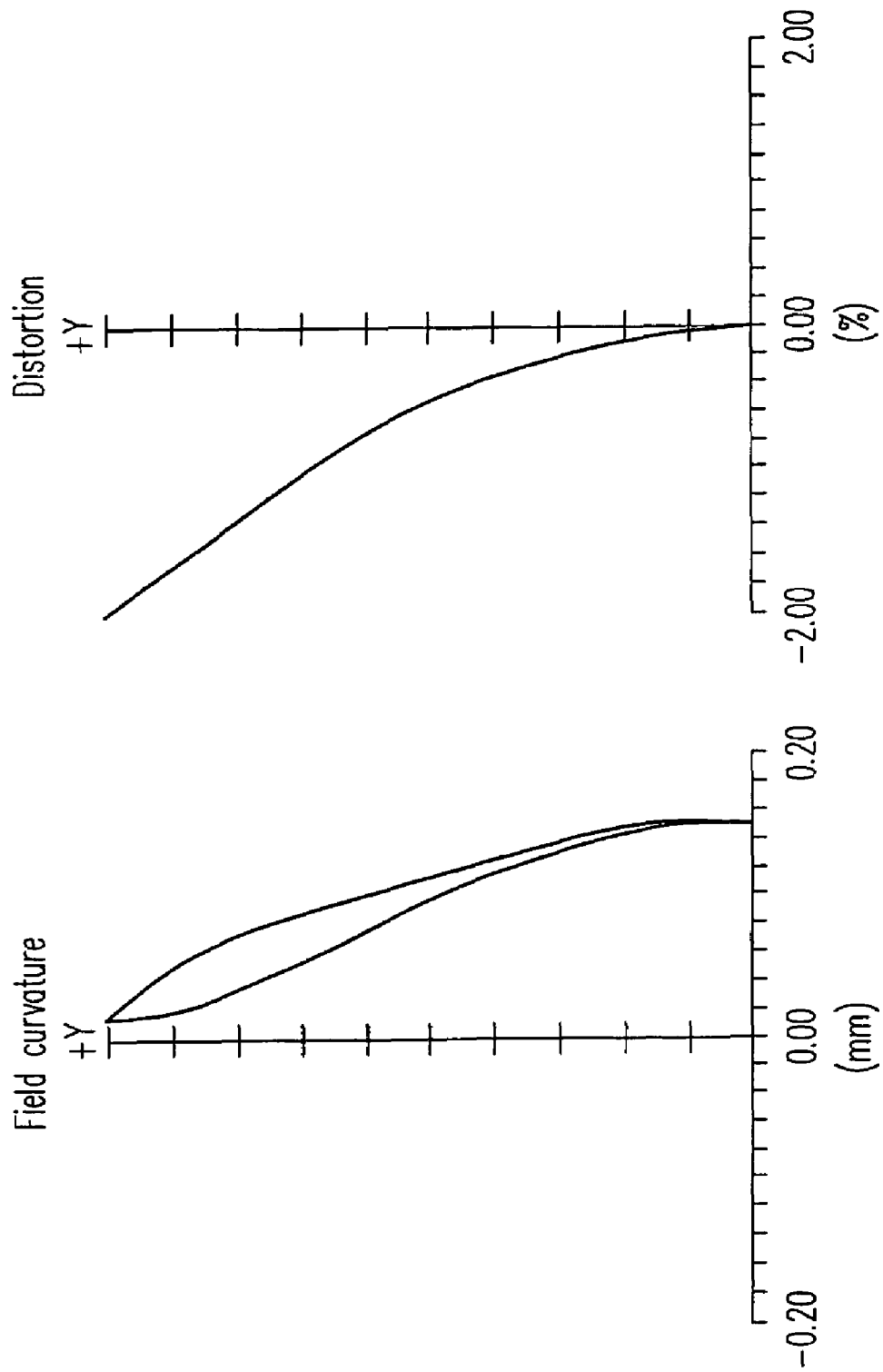
Figure 4C:
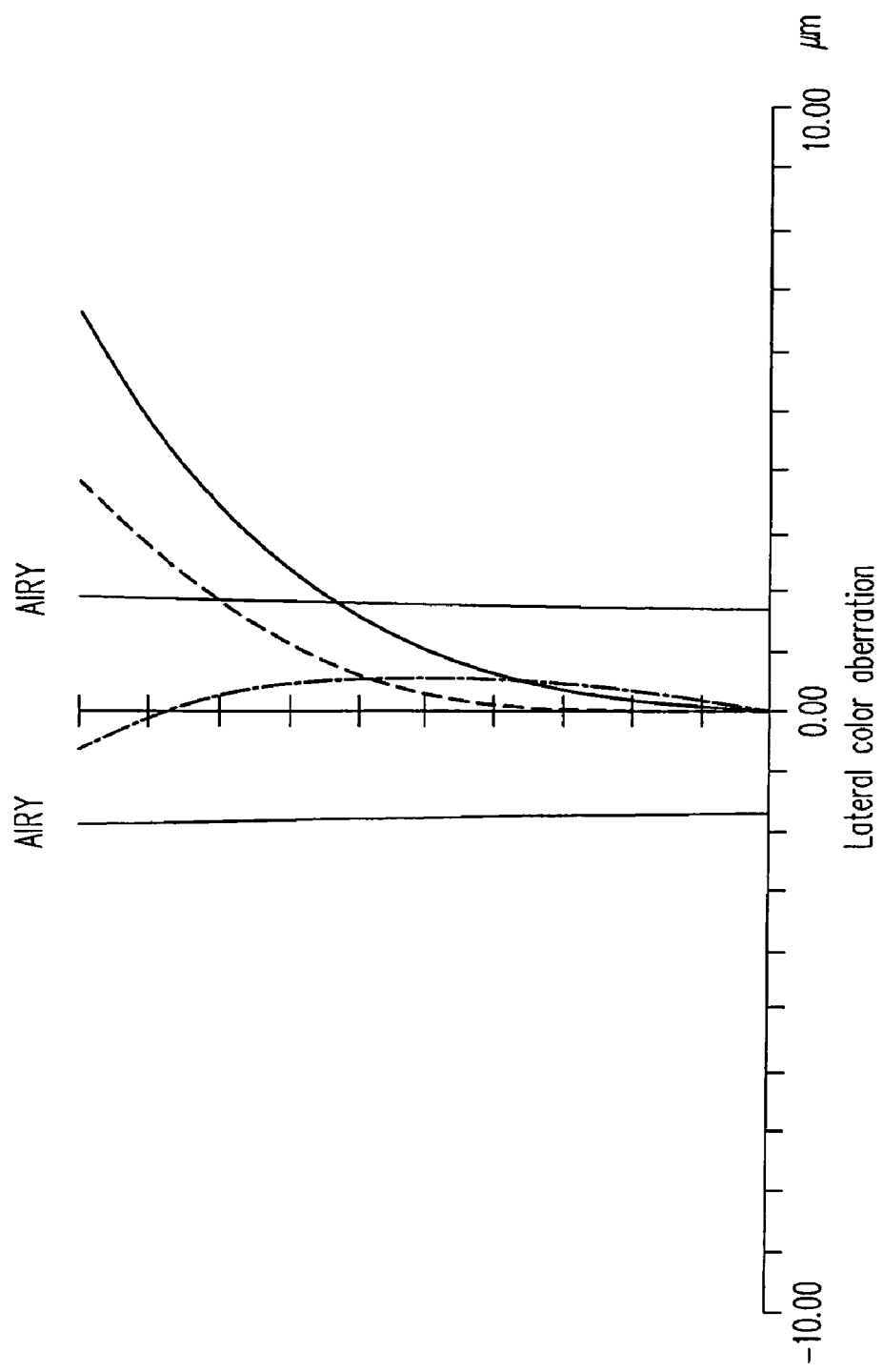

FIGS. 4A to 4C are diagrams showing optical simulation data of imaging of the zoom lens in FIG. 3B. FIG. 4A is a modulation transfer function (MTF) curve diagram, in which the transverse axis is a spatial frequency in cycles per millimeter, and the longitudinal axis is a modulus of the Optical transfer function (OTF). FIG. 4B shows a field curvature diagram and a distortion diagram, and FIG. 4C shows a lateral color aberration diagram.

As shown in FIG. 4A, when the spatial frequency is 47 cycles per millimeter, the modulus of the OTF is still larger than 53%. As shown in FIG. 4B, the distortion is in a range of ±2%. As shown in FIG. 4C, the lateral color aberration is less than 6.8 µm. It can be known from FIGS. 4A to 4C that the zoom lens 300a of the present invention has a good imaging quality.

The Second Embodiment

Figure 5A:
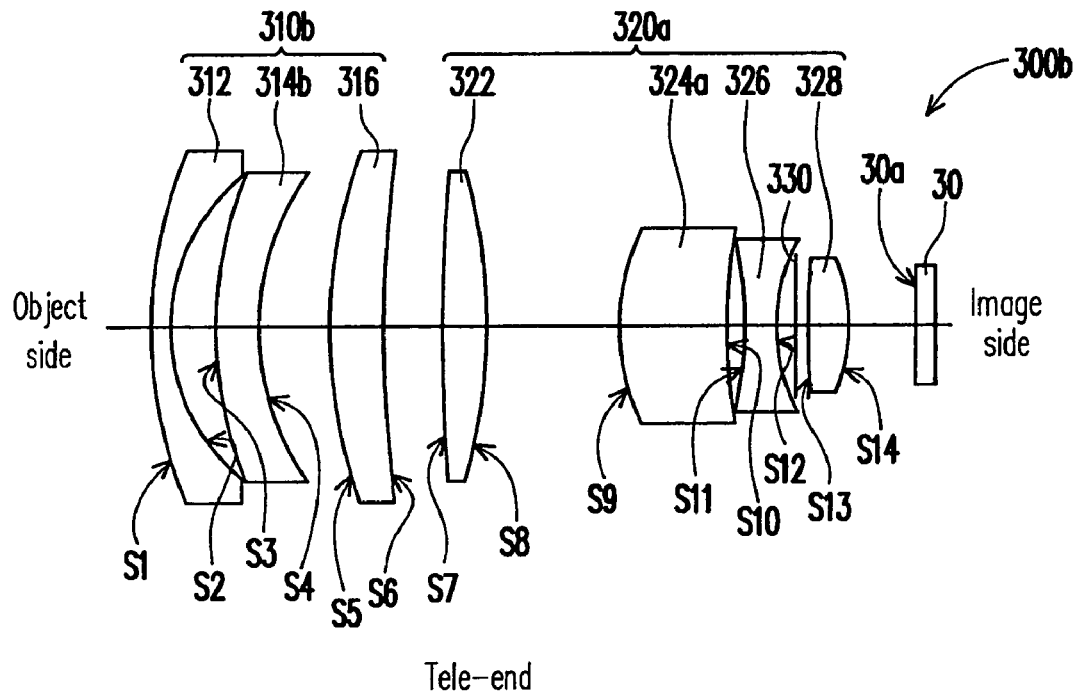
FIGS. 5A to 5B are schematic views of a zoom lens at a tele-end and a wide-end respectively according to a second embodiment of the present invention.
Figure 5B:
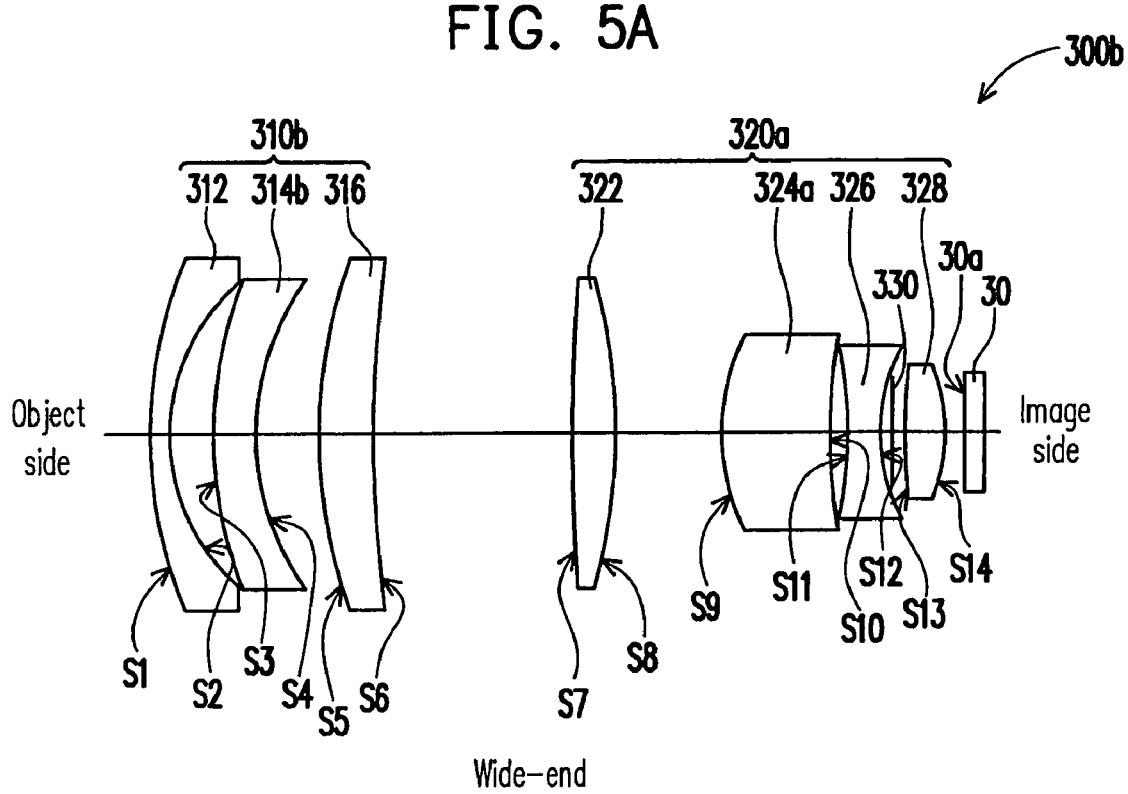

FIGS. 5A to 5B are schematic views of the zoom lens at the tele-end and the wide-end respectively according to the second embodiment of the present invention. Referring to FIGS. 5A to 5B, this embodiment is similar to the first embodiment, and only the difference between a zoom lens 300b of this embodiment and the zoom lens 300a of the first embodiment is described as follows. The zoom lens 300b of this embodiment includes a first lens group 310b and a second lens group 320a, and the main difference between the zoom lens 300b and the above zoom lens 300a lies in that a second lens 314b in the first lens group 310b is a convex-concave lens having a convex surface facing the object side.

An embodiment of the zoom lens 300b is illustrated hereinafter. It should be noted that the data listed in Tables 1 and 2 are not intended to limit the present invention, and people skilled in the art can make some appropriate alternations on the parameters or settings with reference to the disclosure of the present invention without departing from the scope of the present invention.

TABLE 3

| Surface | Curvature (1/mm) | Pitch (mm) | Refractive Index | Abbe Number | Remarks |
|---|---|---|---|---|---|
| S1 | 0.0213 | 4.5000 | 1.743 | 51.2 | The First Lens |
| S2 | 0.0436 | 5.0386 |  |  |  |
| S3 | 0.0030 | 1.7977 | 1.638 | 60.2 | The Second Lens |
| S4 | 0.0289 | 11.6732 |  |  |  |
| S5 | 0.0222 | 5.9416 | 1.846 | 24.0 | The Third Lens |
| S6 | 0.0130 | Variable Pitch (d3) |  |  |  |
| S7 | 0.0097 | 3.3995 | 1.678 | 59.5 | The Fourth Lens |
| S8 | −0.0216 | 3.2495 |  |  |  |
| S9 | 0.0603 | 5.8056 | 1.678 | 55.1 | The Fifth Lens |
| S10 | 0.0064 | 0.6783 |  |  |  |
| S11 | −0.0190 | 6.5550 | 1.785 | 25.6 | The Sixth Lens |
| S12 | 0.0669 | 1.4875 |  |  |  |
| S13 | 0.0083 | 5.6114 | 1.744 | 46.9 | The Seventh Lens |
| S14 | −0.0485 | Variable Pitch (d4) |  |  |  |

In Table 3, the surfaces S1~S14 are the same as those in Table 1, a variable pitch d3 is a distance between the first lens group 310b and the second lens group 320a, and a variable pitch d4 is a distance between the surface S14 and the image processing unit 30.

TABLE 4

|  |  | Wide-end | Tele-end |
|---|---|---|---|
| Effective Focal Length (EFL) |  | 19.86 | 23.82 |
| f-number |  | 2.55 | 2.78 |
| Variable Pitch (mm) | d3 | 17.9376 | 7.4024 |
|  | d4 | 21.505 | 23.949 |

Some important parameters of a focal length of the zoom lens 300b at the wide-end and the tele-end listed in Table 4 include EFL, variable pitches d3 and d4, and f-numbers. It can be known from Table 4 that the f-number of the zoom lens 300b at the wide-end is 2.55. In contrast with the conventional art, the zoom lens 300b has a smaller f-number, so the zoom lens 300b has a larger relative aperture.

Figure 6A:
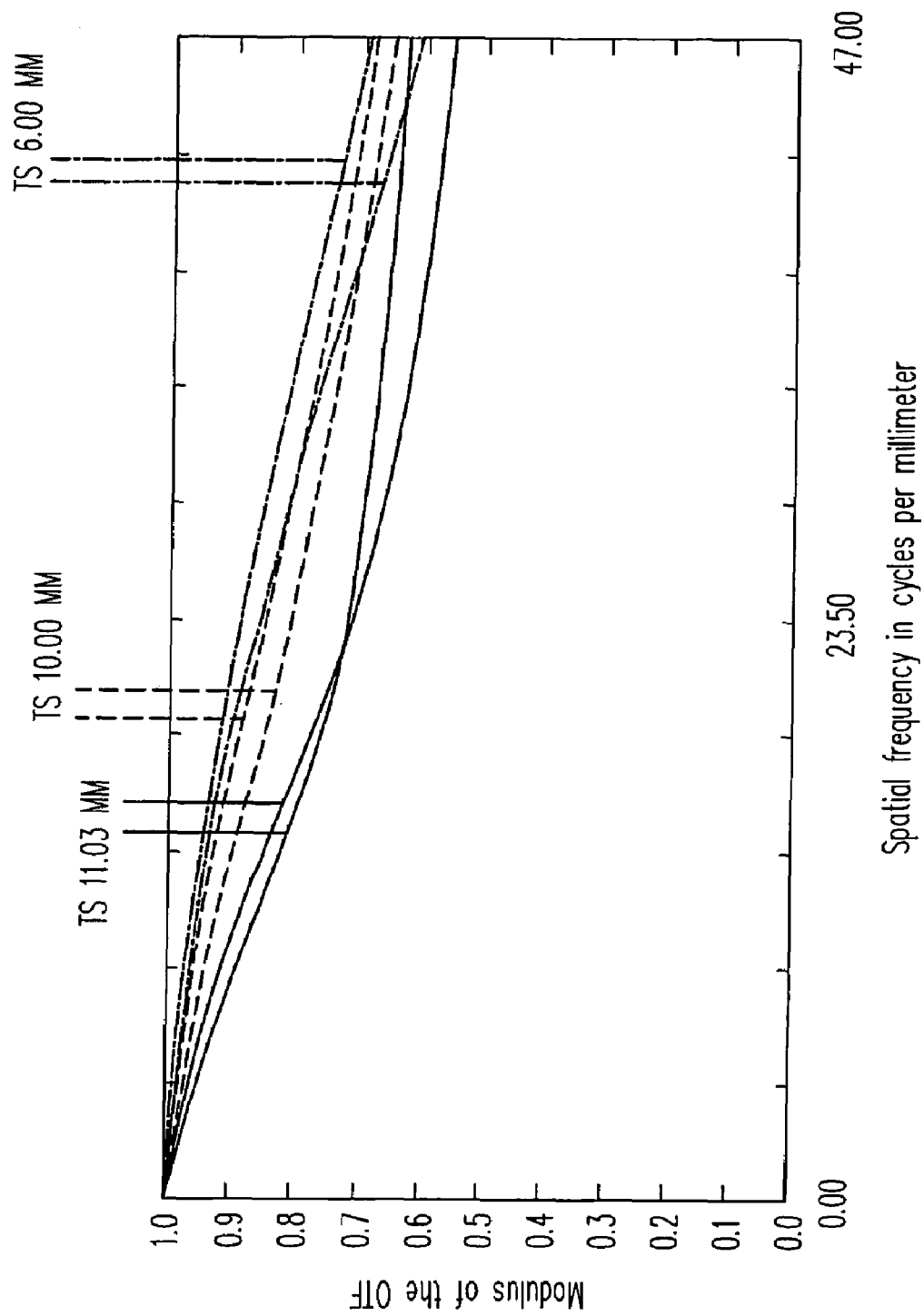
Figure 6B:
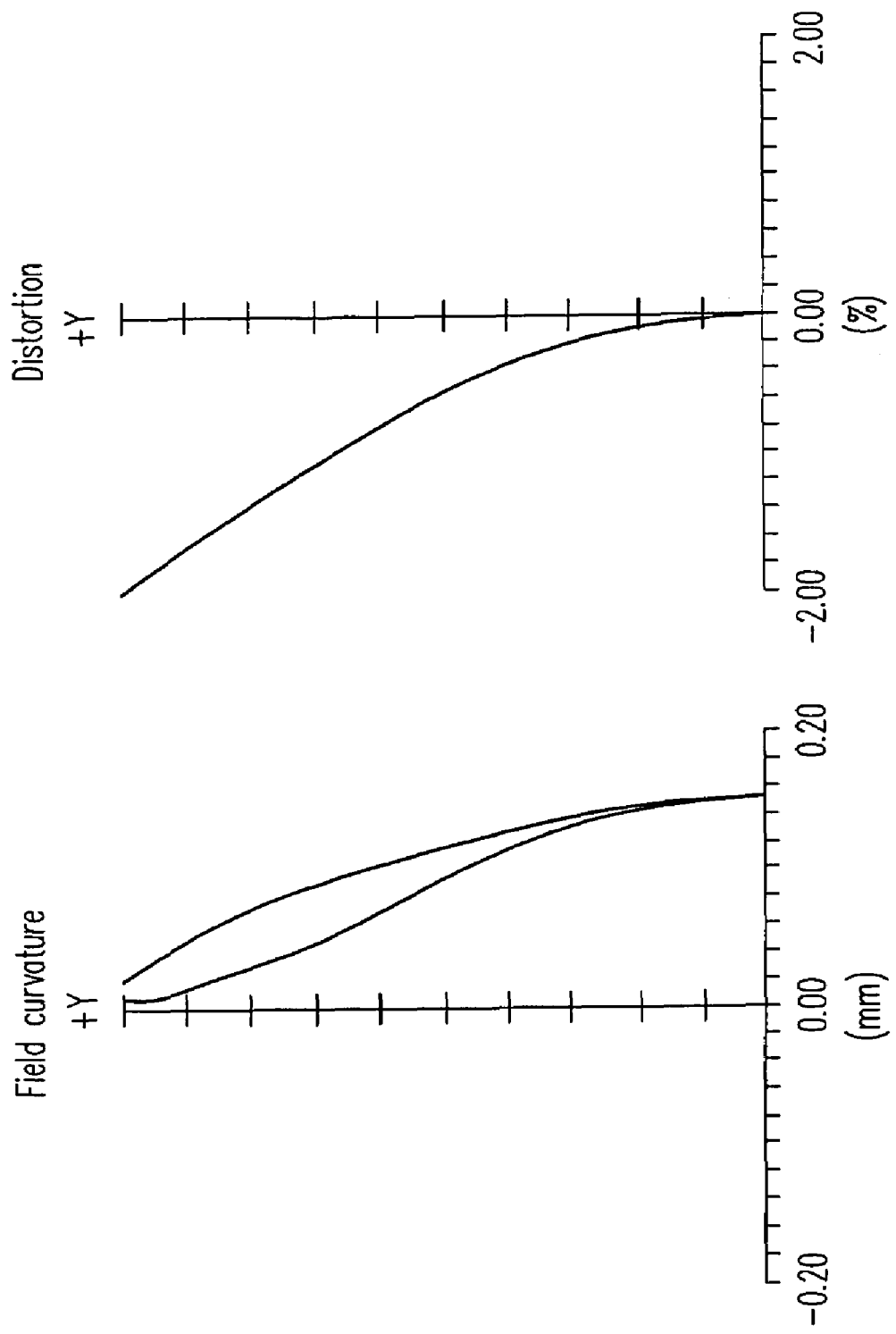

FIGS. 6A to 6C are diagrams showing optical simulation data of imaging of the zoom lens in FIG. 5B. FIG. 6A is an MTF curve diagram, in which the transverse axis is a spatial frequency in cycles per millimeter, and the longitudinal axis is a modulus of the OTF. FIG. 6B shows a field curvature diagram and a distortion diagram, and FIG. 6C shows a lateral color aberration diagram.

As shown in FIG. 6A, when the spatial frequency is 47 cycles per millimeter, the modulus of the OTF is larger than 54%. As shown in FIG. 6B, the distortion is in a range of ±2%. As shown in FIG. 6C, the lateral color aberration of the zoom lens 300b is less than 6.2 µm. It can be known from FIGS. 6A to 6C that the zoom lens 300b of the present invention has a good imaging quality.

The Third Embodiment

Figure 7A:
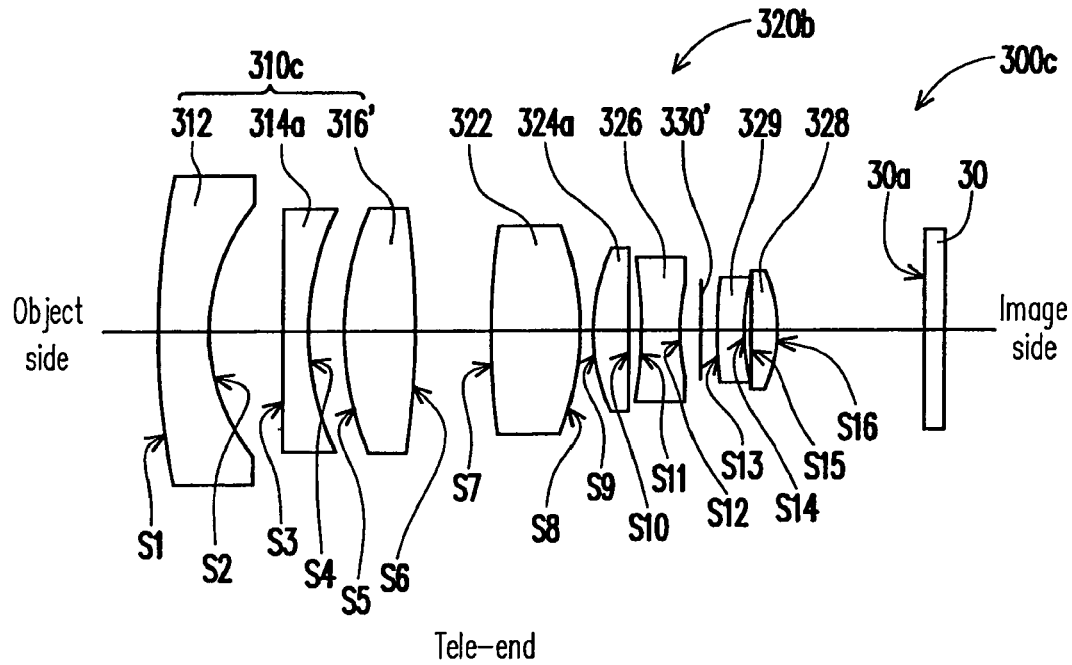
FIGS. 7A to 7B are schematic views of a zoom lens at a tele-end and a wide-end respectively according to a third embodiment of the present invention.
Figure 7B:
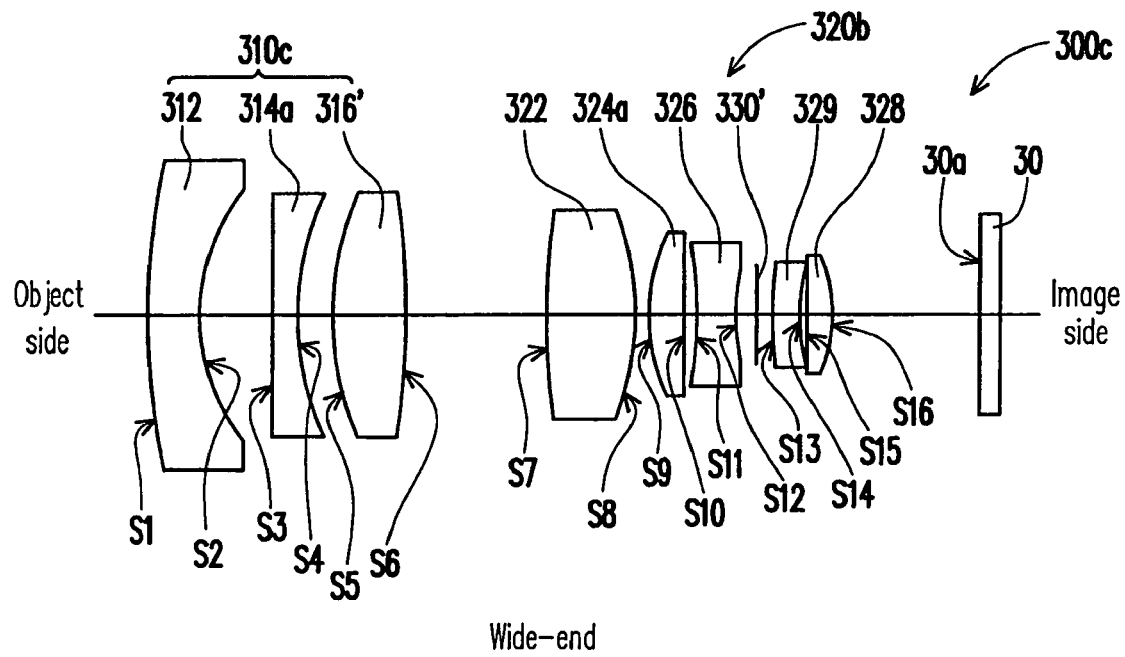

FIGS. 7A to 7B are schematic views of the zoom lens at the tele-end and the wide-end respectively according to a third embodiment of the present invention. Referring to FIGS. 7A to 7B, only the difference between a zoom lens 300c of this embodiment and the above embodiment is described as follows. The zoom lens 300c of this embodiment includes a first lens group 310c and a second lens group 320b, and the main difference between the zoom lens 300c and the zoom lens 300a of the first embodiment lies in that a third lens 316' of the first lens group 310c and a fifth lens 324b of the second lens group 320b are both biconvex lenses, and the second lens group 320b further includes an eighth lens 329.

The eighth lens 329 is disposed between the sixth lens 326 and the seventh lens 328. The eighth lens 329 has a negative refractive power, and the eighth lens 329 may be a convex-concave lens having a convex surface facing the object side. In this embodiment, the eighth lens 329 is a spherical lens. Moreover, the zoom lens 300c further includes an aperture stop 330' disposed between the sixth lens 326 and the eighth lens 329. For example, the aperture stop 330' moves along with the second lens group 320b.

Refractive indices of the sixth lens 326 and the eighth lens 329 are N2n, and Abbe numbers of the sixth lens 326 and the eighth lens 329 are V2n. In this embodiment, in order to prevent the field curvature and image aberration becoming large and to reduce the fabricating cost of the zoom lens 300c, it is limited that 1.85>N2n>1.65. In order to prevent the zoom lens 300c producing a color aberration, it is limited that V2n<40.

In order to reduce a length of the zoom lens 300c to obtain a compact structure, it is limited that Et×fw/ft<6.5, where ft is an EFL of the zoom lens 300c at the tele-end, and Et is a distance between the third lens 316' and the fourth lens 322 when the zoom lens 300c is at the tele-end. fw is an EFL of the zoom lens 300c at the wide-end. In order to prevent a connecting mechanism of the zoom lens 300c from interference, it is limited that Et×fw/ft>3.

The sixth lens 326 and the eighth lens 329 in the second lens group 320b may be made of a glass with a high refractive index (larger than 1.7) and a high dispersion coefficient (between 20 and 50), so as to reduce color aberration effectively.

An embodiment of the zoom lens 300c is illustrated hereinafter. Referring to Table 5, Table 6, and FIGS. 8A to 8C, it should be noted that the data listed in Table 5 and Table 6 are not intended to limit the present invention.

TABLE 5

| Surface | Curvature (1/mm) | Pitch (mm) | Refractive Index | Abbe Number | Remarks |
|---|---|---|---|---|---|
| S1 | 0.0099 | 5.1485 | 1.7190 | 49.45 | The First Lens |
| S2 | 0.0439 | 7.9502 | | | |
| S3 | 0.0000 | 3.0424 | 1.6417 | 81.97 | The Second Lens |
| S4 | 0.0280 | 3.5862 | | | |
| S5 | 0.0281 | 7.1197 | 1.5807 | 45.57 | The Third Lens |
| S6 | −0.0028 | Variable Pitch (d5) | | | |
| S7 | 0.0072 | 9.0612 | 1.6402 | 82.48 | The Fourth Lens |
| S8 | −0.0265 | 1.7777 | | | |
| S9 | 0.0507 | 4.1304 | 1.7995 | 44.57 | The Fifth Lens |
| S10 | −0.0021 | 1.08 | | | |
| S11 | −0.0210 | 4.6204 | 1.7845 | 31.09 | The Sixth Lens |
| S12 | 0.0435 | 4.255 | | | |
| S13 | 0.0108 | 2.9212 | 1.8465 | 32.21 | The Eighth Lens |
| S14 | 0.0420 | 0.6163 | | | |
| S15 | 0.0087 | 2.3595 | 1.8000 | 61.23 | The Seventh Lens |
| S16 | −0.0487 | Variable Pitch (d6) | | | |

In Table 5, the surfaces S1~S12 are the same as those in Table 1, the surfaces S13 and S14 are two surfaces of the eighth lens 329, and the surface S15 and the surface S16 are two surfaces of the seventh lens 328. The variable pitch d5 is a distance between the first lens group 310c and the second lens group 320b, and the variable pitch d6 is a distance between the surface S16 and the image processing unit 30.

TABLE 6

| | | Wide-end | Tele-end |
|---|---|---|---|
| Effective Focal Length (EFL) | | 19.86 | 23.82 |
| f-number | | 2.55 | 2.78 |
| Variable Pitch (mm) | d5 | 16.9734 | 5.783 |
| | d6 | 21.489 | 23.875 |

Some important parameters of a focal length of the zoom lens 300c at the wide-end and the tele-end listed in Table 6 include EFL, variable pitches d5 and d6, and f-numbers. It can be known from Table 6 that the f-number of the zoom lens 300c is 2.55. In contrast with the conventional art, the zoom lens 300c has a smaller f-number, so the zoom lens 300c has a larger relative aperture.

Figure 8A:
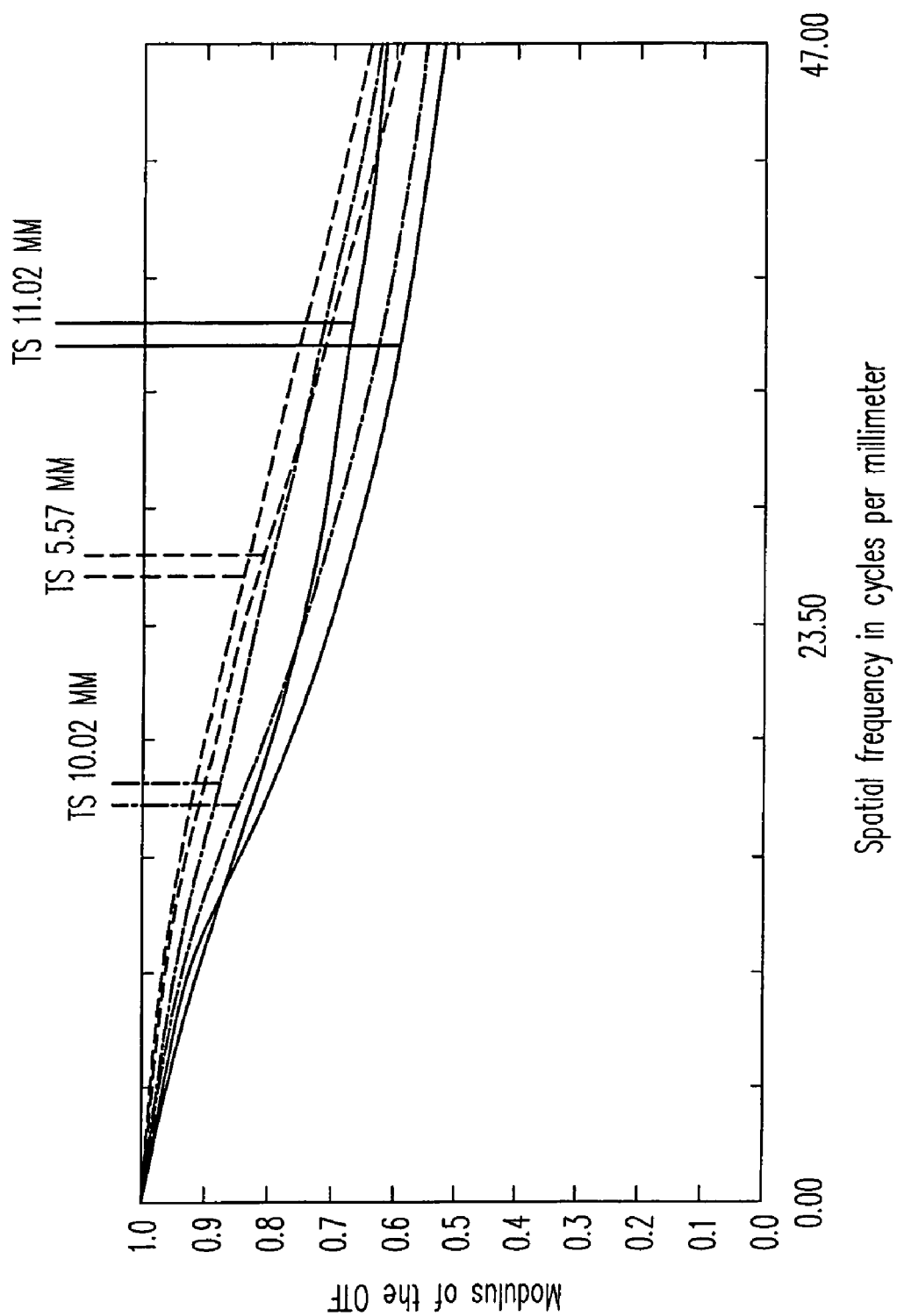
FIGS. 8A to 8C are diagrams showing optical simulation data of imaging of the zoom lens in FIG. 7B.
Figure 8B:
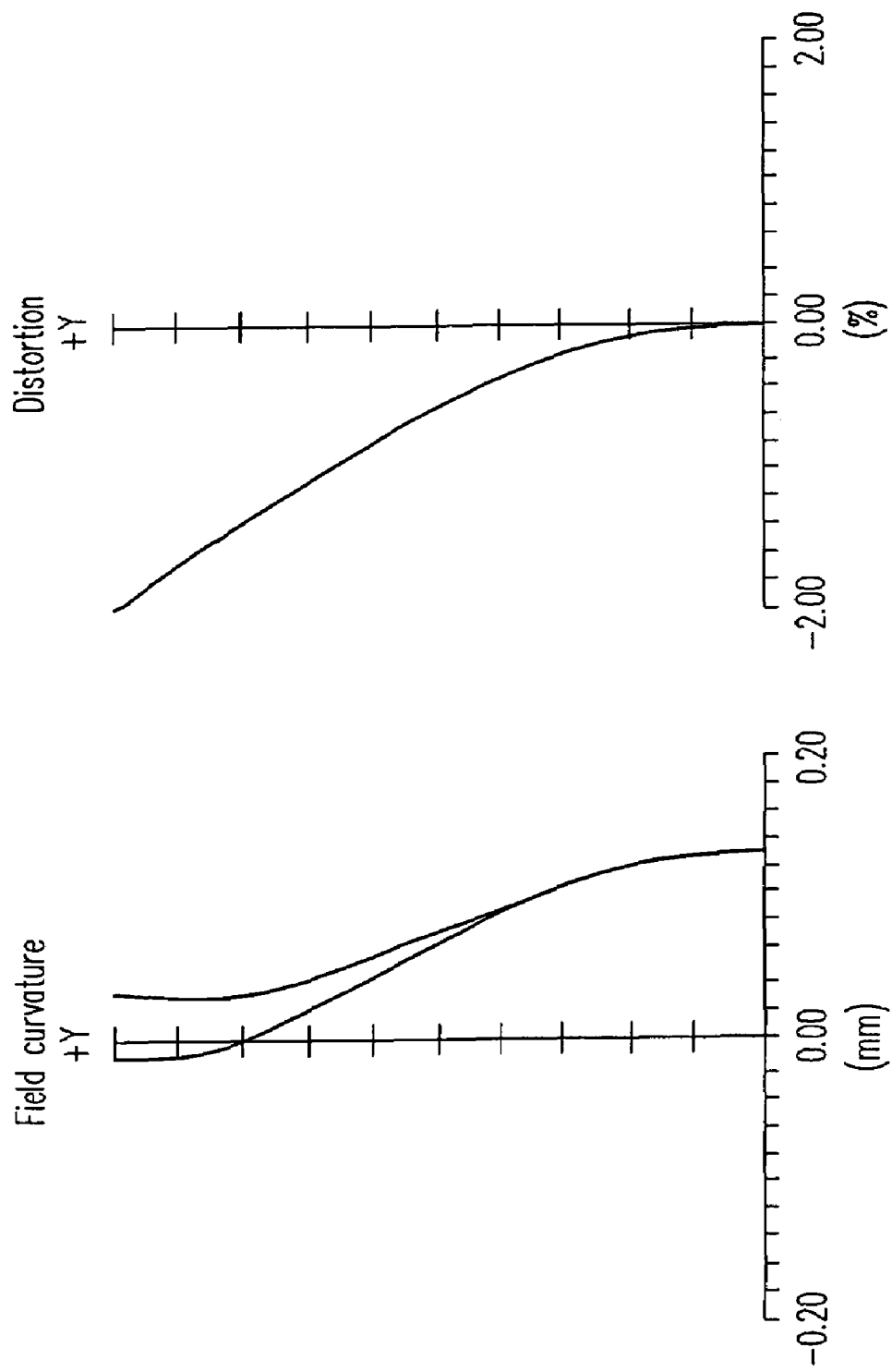
Figure 8C:
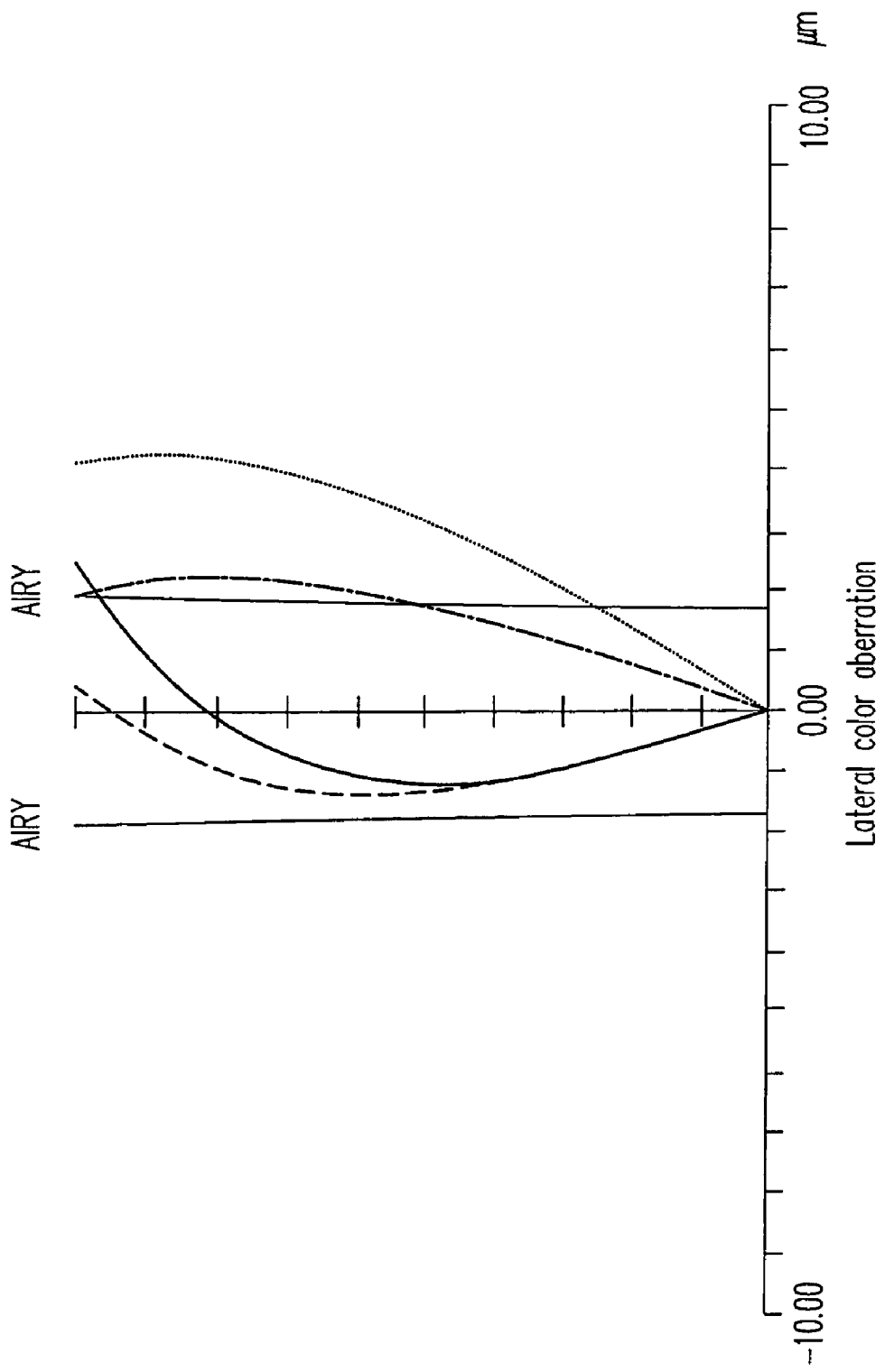

FIGS. 8A to 8C are diagrams showing optical simulation data of imaging of the zoom lens in FIG. 7B. Referring to FIGS. 8A to 8C, FIG. 8A is an MTF curve diagram. It can be known from FIG. 8A that when the spatial frequency is 47 cycles per millimeter, the MTF is still larger than 51%. FIG. 8B shows a field curvature diagram and a distortion diagram, and it can be known from FIG. 8B that the distortion is in a range of ±2%. FIG. 8C is a lateral color aberration diagram, and it can be known from FIG. 8C that the lateral color aberration is less than 4.3 μm. It can be known from FIGS. 8A to 8C that measured graphics of the MTF curve diagram, the field curvature diagram, the distortion diagram, and the lateral color aberration diagram fall within a standard range, so the zoom lens 300c of the present invention has a good imaging quality.

The Fourth Embodiment

Figure 9A:
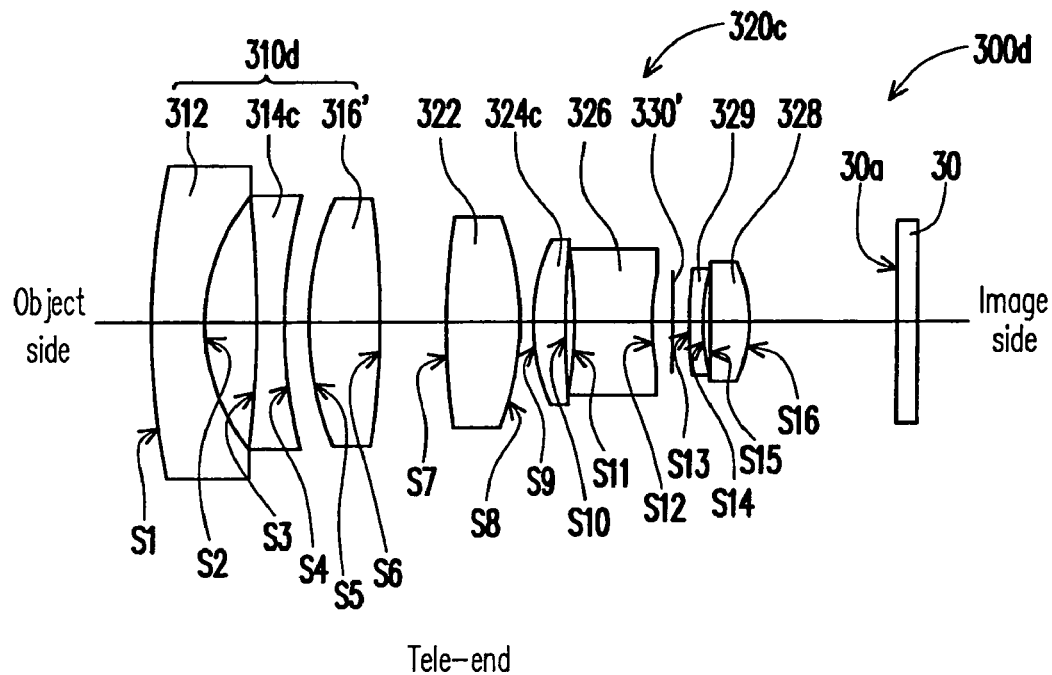
FIGS. 9A to 9B are schematic views of a zoom lens at a tele-end and a wide-end respectively according to a fourth embodiment of the present invention.
Figure 9B:
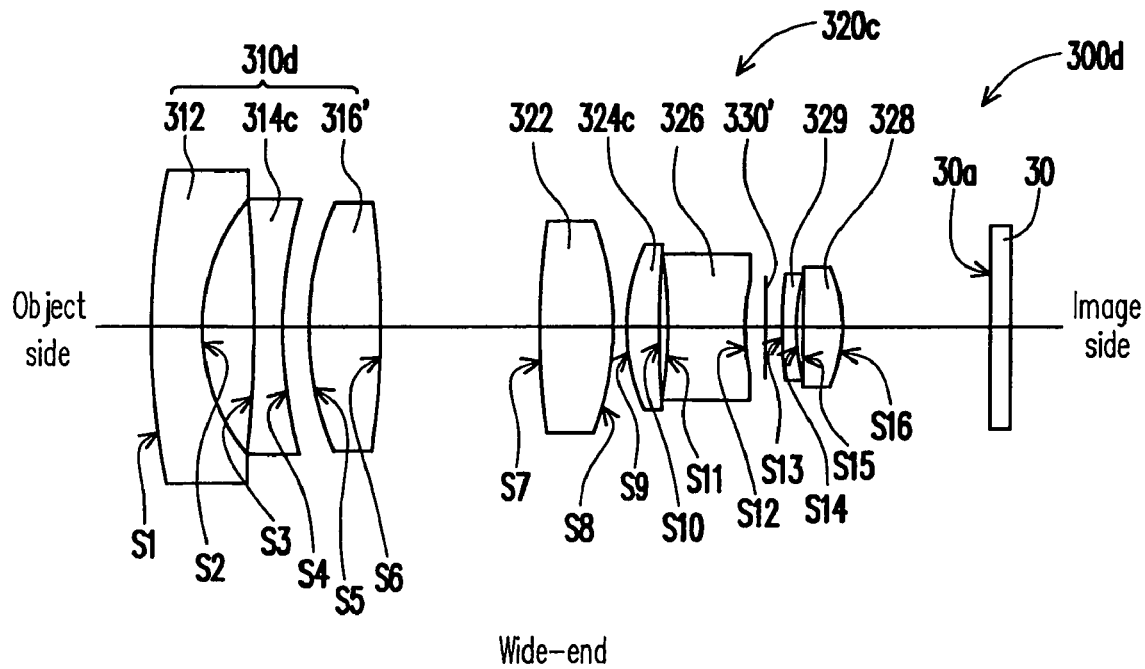

FIGS. 9A to 9B are schematic views of the zoom lens at the tele-end and the wide-end respectively according to a fourth embodiment of the present invention. Referring to FIGS. 9A to 9B, this embodiment is similar to the third embodiment, and only the difference between a zoom lens 300d of this embodiment and the zoom lens 300c of the third embodiment is described as follows. The zoom lens 300d of this embodiment includes a first lens group 310d and a second lens group 320c, and the main difference between the zoom lens 300d and the zoom lens 300c of the third embodiment lies in that a second lens 314c of the first lens group 310d is a biconcave lens, and a fifth lens 324c of the second lens group 320c is a concave-convex lens having a convex surface facing the object side.

An embodiment of the zoom lens 300d is illustrated hereinafter. Referring to Table 7, Table 8, and FIGS. 10A to 10C, it should be noted that the data listed in Table 7 and Table 8 is not intended to limit the present invention.

TABLE 7

| Surface | Curvature (1/mm) | Pitch (mm) | Refractive Index | Abbe Number | Remark |
|---|---|---|---|---|---|
| S1 | 0.0209 | 3.2186 | 1.7631 | 53.41 | The First Lens |
| S2 | 0.0559 | 7.7130 | | | |
| S3 | −0.0193 | 3.0340 | 1.6377 | 74.29 | The Second Lens |
| S4 | 0.0194 | 1.3124 | | | |
| S5 | 0.0277 | 8.9763 | 1.5838 | 46.57 | The Third Lens |
| S6 | −0.0148 | Variable Pitch (d7) | | | |
| S7 | 0.0088 | 5.9214 | 1.6400 | 81.99 | The Fourth Lens |
| S8 | −0.0260 | 2.3811 | | | |
| S9 | 0.0516 | 3.8242 | 1.7992 | 39.27 | The Fifth Lens |
| S10 | 0.0029 | 0.5925 | | | |
| S11 | −0.0158 | 6.9662 | 1.7849 | 27.33 | The Sixth Lens |
| S12 | 0.0509 | 4.1890 | | | |
| S13 | 0.0156 | 0.9168 | 1.8475 | 25.34 | The Eighth Lens |
| S14 | 0.0417 | 0.5154 | | | |
| S15 | 0.0133 | 3.5993 | 1.7996 | 44.90 | The Seventh Lens |
| S16 | −0.0442 | Variable Pitch (d8) | | | |

In Table 7, the surfaces S1~16 are the same as those in Table 5. The variable pitch d7 is a distance between the first lens group 310d and the second lens group 320c, and the variable pitch d8 is a distance between the surface S16 and the image processing unit 30.

TABLE 8

| | | Wide-end | Tele-end |
|---|---|---|---|
| Effective Focal Length (EFL) | | 19.86 | 23.82 |
| f-number | | 2.55 | 2.78 |
| Variable Pitch (mm) | d7 | 16.9779 | 5.752 |
| | d8 | 21.4658 | 23.875 |

Some important parameters of a focal length of the zoom lens 300d at the wide-end and the tele-end listed in Table 8 include EFL, variable pitches d7 and d8, and f-numbers. It can be known from Table 8 that the f-number of the zoom lens 300d is 2.55. In contrast with the conventional art, the zoom lens 300d has a smaller f-number, so the zoom lens 300d has a larger relative aperture.

Figure 10A:
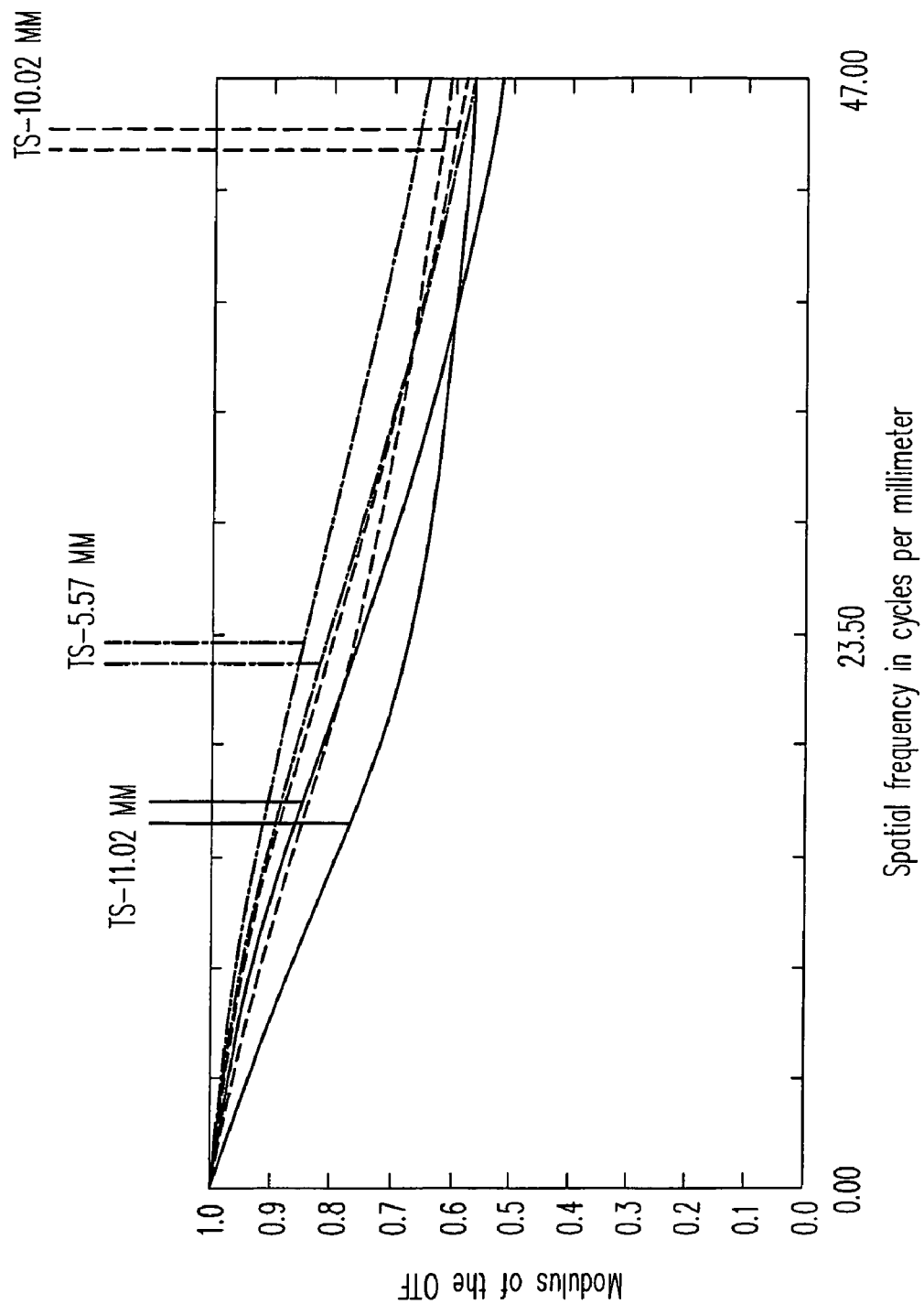
Figure 10B:
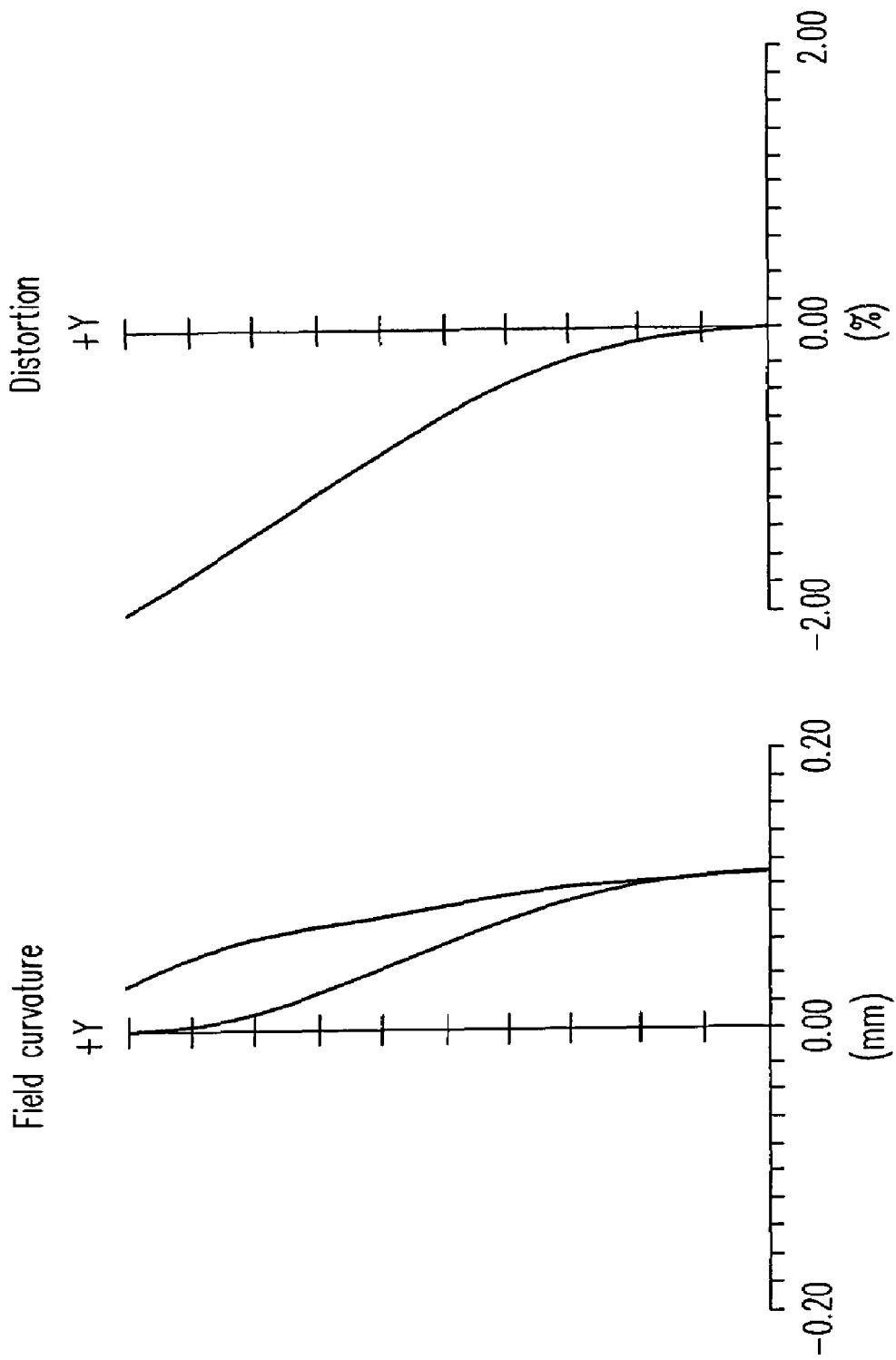

FIGS. 10A to 10C are diagrams showing optical simulation data of imaging of the zoom lens in FIG. 9B. Referring to FIGS. 10A to 10C, FIG. 10A is an MTF curve diagram. It can be known from FIG. 10A that when the spatial frequency is 47 cycles per millimeter, the MTF is still larger than 51%. FIG. 10B shows a field curvature diagram and a distortion diagram, and it can be known from FIG. 10B that the distortion is in a range of ±2%. FIG. 10C is a lateral color aberration diagram, and it can be known from FIG. 10C that the lateral color aberration is less than 10 µm. It can be known from FIGS. 10A to 10C that measured graphics of the MTF curve diagram, the field curvature diagram, the distortion diagram, and the lateral color aberration diagram all fall within a standard range, so the zoom lens 300d of the present invention has a good imaging quality.

Based on the above, the zoom lens according to the embodiments of the present invention has at least one or a part of or all of the following advantages:

1. The zoom lens may use spherical lenses instead of aspheric lenses, so has an advantage of a low fabricating cost.

2. A architecture of the zoom lens can eliminate image aberration, color aberration, and distortion effectively, thus providing a good imaging quality.

3. The f-number of the zoom lens may be 2.55. In comparison with the conventional art, the f-number is smaller, so that a larger relative aperture is obtained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens, comprising:
   a first lens group, having a negative refractive power, and comprising a first lens, a second lens, and a third lens arranged from an object side to an image side in sequence, wherein the first lens is a convex-concave lens having a convex surface facing the object side, the second lens is a concave lens having a concave surface facing the image side, and the third lens is a convex lens having a convex surface facing the object side; and
   a second lens group, having a positive refractive power and disposed between the first lens group and the image side, and the second lens group comprising a fourth lens, a fifth lens, a sixth lens, and a seventh lens arranged from the object side to the image side in sequence, wherein refractive powers of the fourth lens, fifth lens, sixth lens, and seventh lens are positive, positive, negative, and positive sequentially, and the first lens group and the second lens group are capable of moving between the object side and the image side;

wherein the first, second, third, fourth, fifth, sixth, and seventh lenses are all spherical lenses.

2. The zoom lens as claimed in claim 1, wherein the second lens is a plano-concave lens having a planar surface facing the object side or a convex-concave lens having a convex surface facing the object side, and the third lens is a concave-convex lens having a convex surface facing the object side.

3. The zoom lens as claimed in claim 1, wherein the zoom lens satisfies 3<Etxfw/ft<6.5 when the zoom lens is at a tele-end, where Et is a distance between the third lens and the fourth lens, and ft is an effective focal length of the zoom lens at the tele-end.

4. The zoom lens as claimed in claim 1, wherein the fourth lens and the seventh lens are both biconvex lenses, the fifth lens is a concave-convex lens having a convex surface facing the object side, and the sixth lens is a biconcave lens.

5. The zoom lens as claimed in claim 1, further comprising an aperture stop disposed between the sixth lens and the seventh lens, and being capable of moving along with the second lens group.

6. The zoom lens as claimed in claim 1, satisfying the conditions:

1.85>N6>1.65;

V6<40, where N6 is a refractive index of the sixth lens, and V6 is an Abbe number of the sixth lens.

7. The zoom lens as claimed in claim 1, wherein the second lens group further comprises an eighth lens disposed between the sixth lens and the seventh lens, and the eighth lens having a negative refractive power.

8. The zoom lens as claimed in claim 7, wherein the second lens is a biconcave lens, and the third lens is a biconvex lens.

9. The zoom lens as claimed in claim 8, wherein the fourth lens and the seventh lens are both biconvex lenses, the fifth lens is a concave-convex lens having a convex surface facing the object side, the sixth lens is a biconcave lens, and the eighth lens is a convex-concave lens having a convex surface facing the object side.

10. The zoom lens as claimed in claim 7, wherein the second lens is a plano-concave lens having a planar surface facing the object side, and the third lens is a biconvex lens.

11. The zoom lens as claimed in claim 10, wherein the fourth lens and the seventh lens are both biconvex lenses, the fifth lens is a biconvex lens, the sixth lens is a biconcave lens, and the eighth lens is a convex-concave lens having a convex surface facing the object side.

12. The zoom lens as claimed in claim 7, wherein the first, second, third, fourth, fifth, sixth, seventh, and eighth lenses are all spherical lenses.

13. The zoom lens as claimed in claim 7, further comprising an aperture stop disposed between the sixth lens and the eighth lens, and being capable of moving along with the second lens group.

14. The zoom lens as claimed in claim 7, satisfying the conditions:

1.85>N2n>1.65;

V2n<40, where N2n are refractive indices of the sixth lens and the eighth lens, and V2n are Abbe numbers of the sixth lens and the eighth lens.

* * * * *